(12) United States Patent
Kikuchi et al.

(10) Patent No.: US 9,509,899 B2
(45) Date of Patent: Nov. 29, 2016

(54) CAMERA SYSTEM AND METHOD FOR CORRECTING FOCUS DETECTION PIXEL

(71) Applicant: Olympus Corporation, Hachioji-shi, Tokyo (JP)

(72) Inventors: Tetsuo Kikuchi, Hachioji (JP); Kazumi Ito, Fuchu (JP); Kazumasa Kunugi, Hino (JP); Yukie Yamazaki, Hachioji (JP); Yoshinobu Omata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/082,139

(22) Filed: Mar. 28, 2016

(65) Prior Publication Data

US 2016/0212325 A1 Jul. 21, 2016

Related U.S. Application Data

(63) Continuation of application No. PCT/JP2014/075278, filed on Sep. 24, 2014.

(30) Foreign Application Priority Data

Sep. 30, 2013 (JP) .................................. 2013-205951

(51) Int. Cl.
*H04N 5/232* (2006.01)
*H04N 5/357* (2011.01)
(Continued)

(52) U.S. Cl.
CPC ............ *H04N 5/23212* (2013.01); *G02B 7/28* (2013.01); *G02B 7/34* (2013.01); *G03B 17/14* (2013.01);
(Continued)

(58) Field of Classification Search
CPC ...... G03B 7/102; G03B 17/14; G03B 13/36; H04N 5/23209; H04N 5/23212; H04N 5/3572; H04N 5/3696
See application file for complete search history.

(56) References Cited

U.S. PATENT DOCUMENTS 8,405,760 B2 3/2013 Yamasaki
8,477,233 B2 7/2013 Oikawa
(Continued)

FOREIGN PATENT DOCUMENTS

JP 2006-157457 6/2006
JP 2007-121896 5/2007
(Continued)

OTHER PUBLICATIONS

Translation of International Preliminary Report on Patentability and Written Opinion of the International Searching Authority to International Application No. PCT/JP2014/075278, mailed on Apr. 14, 2016 (8 pgs.).

(Continued)

*Primary Examiner* — Paul Berardesca
(74) *Attorney, Agent, or Firm* — John C. Pokotylo; Straub & Pokotylo

(57) ABSTRACT

A camera system includes an interchangeable lens and a camera main body. The interchangeable lens includes a lens side storage unit that stores pupil related data according to an image height. The camera main body includes an image sensor including focus detection pixels, a main body side storage unit that stores correction data, and a correction unit corrects non-uniformity in illumination distribution of outputs of the focus detection pixels. The pupil related data is data regarding an F-number and an exit pupil position. The data regarding the F-number indicates a range of luminous flux to be applied to the focus detection pixels at a predetermined image height. The data regarding the exit pupil position relates to a position of intersection of a center of luminous flux applied to the focus detection pixels at a predetermined image height and an optical axis of the imaging optical system.

8 Claims, 7 Drawing Sheets

(51) Int. Cl.
  H04N 5/369  (2011.01)
  H04N 5/238  (2006.01)
  H04N 5/243  (2006.01)
  H04N 5/225  (2006.01)
  G03B 17/14  (2006.01)
  G02B 7/34   (2006.01)
  G02B 7/28   (2006.01)

(52) U.S. Cl.
  CPC ............ *H04N 5/2254* (2013.01); *H04N 5/238* (2013.01); *H04N 5/23209* (2013.01); *H04N 5/243* (2013.01); *H04N 5/3572* (2013.01); *H04N 5/3696* (2013.01); *G03B 2206/00* (2013.01)

(56) References Cited

U.S. PATENT DOCUMENTS

| | | | |
|---|---|---|---|
| 8,810,713 B2 | 8/2014 | Matsuo et al. | |
| 2012/0081594 A1* | 4/2012 | Makigaki | H04N 5/23209 348/340 |

FOREIGN PATENT DOCUMENTS

| | | |
|---|---|---|
| JP | 2007-189312 | 7/2007 |
| JP | 2009-244858 | 10/2009 |
| JP | 2010-049209 | 3/2010 |
| JP | 2010-107770 | 5/2010 |
| JP | 2011-123133 | 6/2011 |
| JP | 2013-037295 | 2/2013 |

OTHER PUBLICATIONS

International Search Report to International Patent Application No. PCT/JP2014/075278, mailed on Nov. 4, 2014 (3 pgs.) with translation (2 pgs.).

Written Opinion of the International Searching Authority to International Patent Application No. PCT/JP2014/075278, mailed on Nov. 4, 2014 (4 pgs.).

Japanese First Office Action to Japanese Patent Application No. 2013-205951, mailed on Nov. 4, 2014 (4 pgs.) with translation (4 pgs.).

* cited by examiner

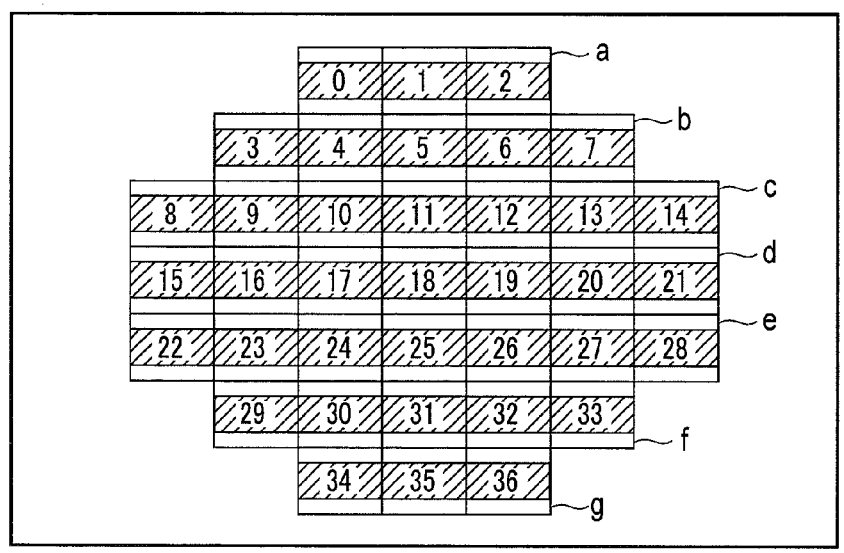
F I G. 2
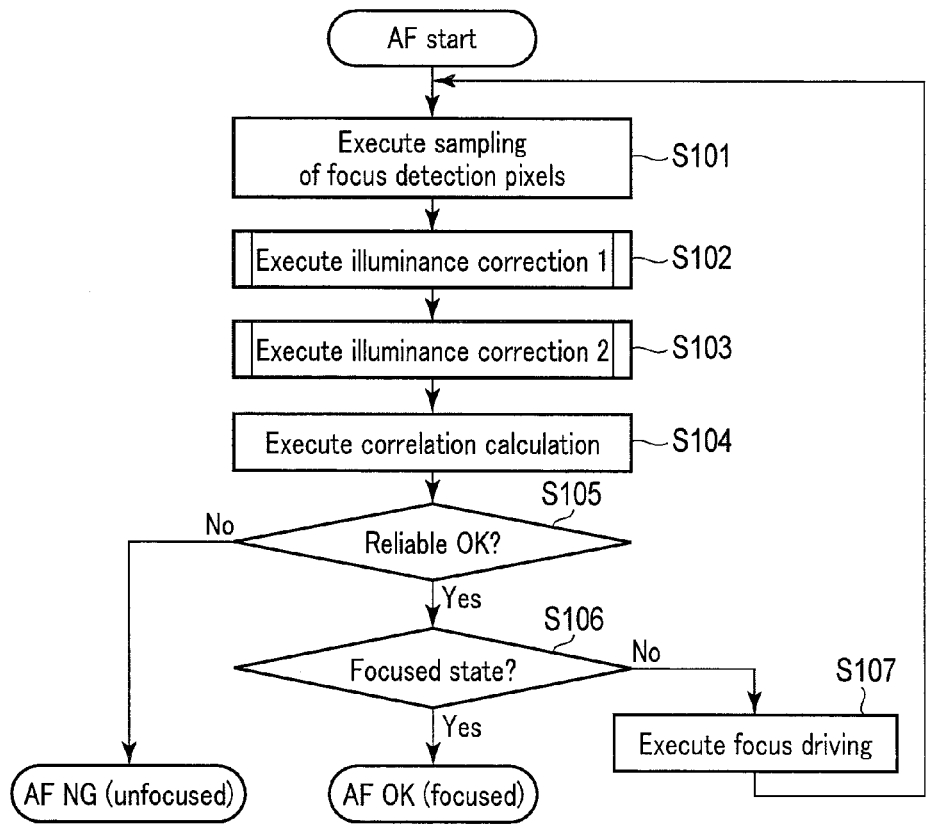
F I G. 3

| X | -0.15 | -0.1 | -0.05 | 0 | 0.05 | 0.1 | 0.15 |
|---|---|---|---|---|---|---|---|
| CFno | 3 | 2.5 | 2 | 2 | 2 | 2.5 | 3 |
| CEXPI | 40 | 40 | 40 | 40 | 40 | 40 | 40 |

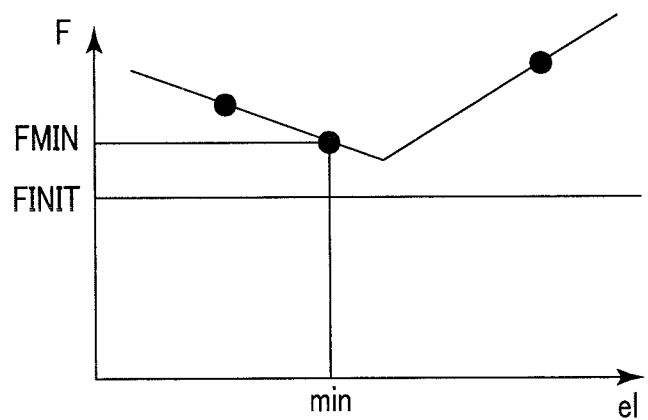
F I G. 11A
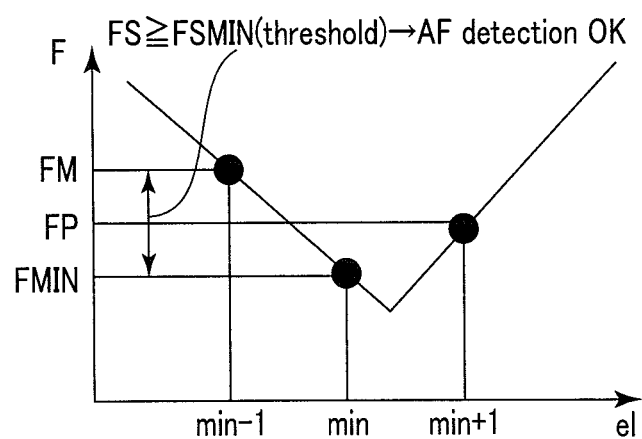
F I G. 11B

CAMERA SYSTEM AND METHOD FOR CORRECTING FOCUS DETECTION PIXEL

CROSS-REFERENCE TO RELATED APPLICATIONS

This application is a Continuation Application of PCT Application No. PCT/JP2014/075278, filed Sep. 24, 2014 and based upon and claiming the benefit of priority from the prior Japanese Patent Application No. 2013-205951, filed Sep. 30, 2013, the entire contents of both of which are incorporated herein by reference.

BACKGROUND OF THE INVENTION

1. Field of the Invention

The present invention relates to a camera system including an image sensor having a focus detection pixel and a method for correcting the focus detection pixel.

2. Description of the Related Art

Imaging apparatuses that detect a focus state by using part of pixels of an image sensor as a focus detection element are known. The imaging apparatuses detect the focus state of an imaging lens by setting part of pixels of the image sensor as focus detection pixels, forming an image on a plurality of focus detection pixels by luminous fluxes of a target object that has passed through different pupil regions symmetrical relative to an optical axis of the imaging lens, and detecting a phase difference between the luminous fluxes of the target object.

It is known that the amount of luminous flux applied through the imaging lens decreases as the distance from the optical axis of the imaging lens becomes larger due to optical properties of the imaging lens in the imaging apparatuses. Accordingly, illuminance on the target object image formed on the image sensor exhibits non-uniformity. The process to correct non-uniformity of illuminance is called illuminance correction or shading correction. For example, the method for multiplying a correction coefficient in accordance with the distance from the optical axis by a pixel output is known as the illuminance correction. However, the method for multiplying a correction coefficient in accordance with the distance from the optical axis by a pixel output cannot be applied to a focus detection pixel since the amount of received light varies based on various conditions such as the arrangement of an opening. The imaging apparatus disclosed in Jpn. Pat. Appln. KOKAI Publication No. 2009-244858 includes a coefficient for focus detection pixels in addition to a correction coefficient for imaging pixels within a ROM provided to a camera main body, and selectively uses the corresponding correction coefficient for a pixel to be corrected.

BRIEF SUMMARY OF THE INVENTION

According to a first aspect of the invention, there is provided a camera system comprising an interchangeable lens including an imaging optical system including a focus lens, and a camera main body to which the interchangeable lens is detachably attached, wherein the interchangeable lens comprises a lens side storage unit that stores pupil related data according to an image height, wherein the camera main body comprises: an image sensor including a plurality of imaging pixels for imaging, and a plurality of focus detection pixels for focus detection; a main body side storage unit that stores correction data for correcting non-uniformity in illumination distribution by incident light to the focus detection pixels based on outputs of the focus detection pixels; and a correction unit that receives the pupil related data from the lens side storage unit, and corrects non-uniformity in illumination distribution of outputs of the focus detection pixels based on the correction data and the pupil related data, wherein the pupil related data is data regarding an F-number of the interchangeable lens and data regarding an exit pupil position of the interchangeable lens, wherein the data regarding the F-number of the interchangeable lens indicates a range of luminous flux to be applied to the focus detection pixels at a predetermined image height, and wherein the data regarding the exit pupil position of the interchangeable lens relates to a position of intersection of a center of luminous flux applied to the focus detection pixels at a predetermined image height and an optical axis of the imaging optical system.

According to a second aspect of the invention, there is provided a method for focus detection pixel correction for correcting an output of a focus detection pixel in a camera system comprising an interchangeable lens which include an imaging optical system including a focus lens and which stores pupil related data according to an image height, and a camera main body to which the interchangeable lens is detachably attached and which comprises an image sensor including a plurality of imaging pixels for imaging, and a plurality of focus detection pixels for focus detection, the method comprising: reading correction data stored in the camera main body for correcting non-uniformity in illumination distribution by incident light to the focus detection pixels based on outputs of the focus detection pixels; receiving the pupil related data from the interchangeable lens; and correcting non-uniformity in illumination distribution of the outputs of the focus detection pixels based on the correction data and the pupil related data, wherein the pupil related data is data regarding an F-number of the interchangeable lens and data regarding an exit pupil position of the interchangeable lens, wherein the data regarding the F-number of the interchangeable lens indicates a range of luminous flux to be applied to the focus detection pixels at a predetermined image height, and wherein the data regarding the exit pupil position of the interchangeable lens relates to a position of intersection of a center of luminous flux applied to the focus detection pixels at a predetermined image height and an optical axis of the imaging optical system.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 illustrates the arrangement of focus detection pixels of an example image sensor;

FIG. 3 is a flowchart showing the AF operation of the camera system;

FIG. 11A is a first graph showing an example of reliability determination;

FIG. 11B is a second graph showing an example of reliability determination.

DETAILED DESCRIPTION OF THE INVENTION

Hereinafter, embodiments of the present invention will be described with reference to the drawings.

Figure 1:
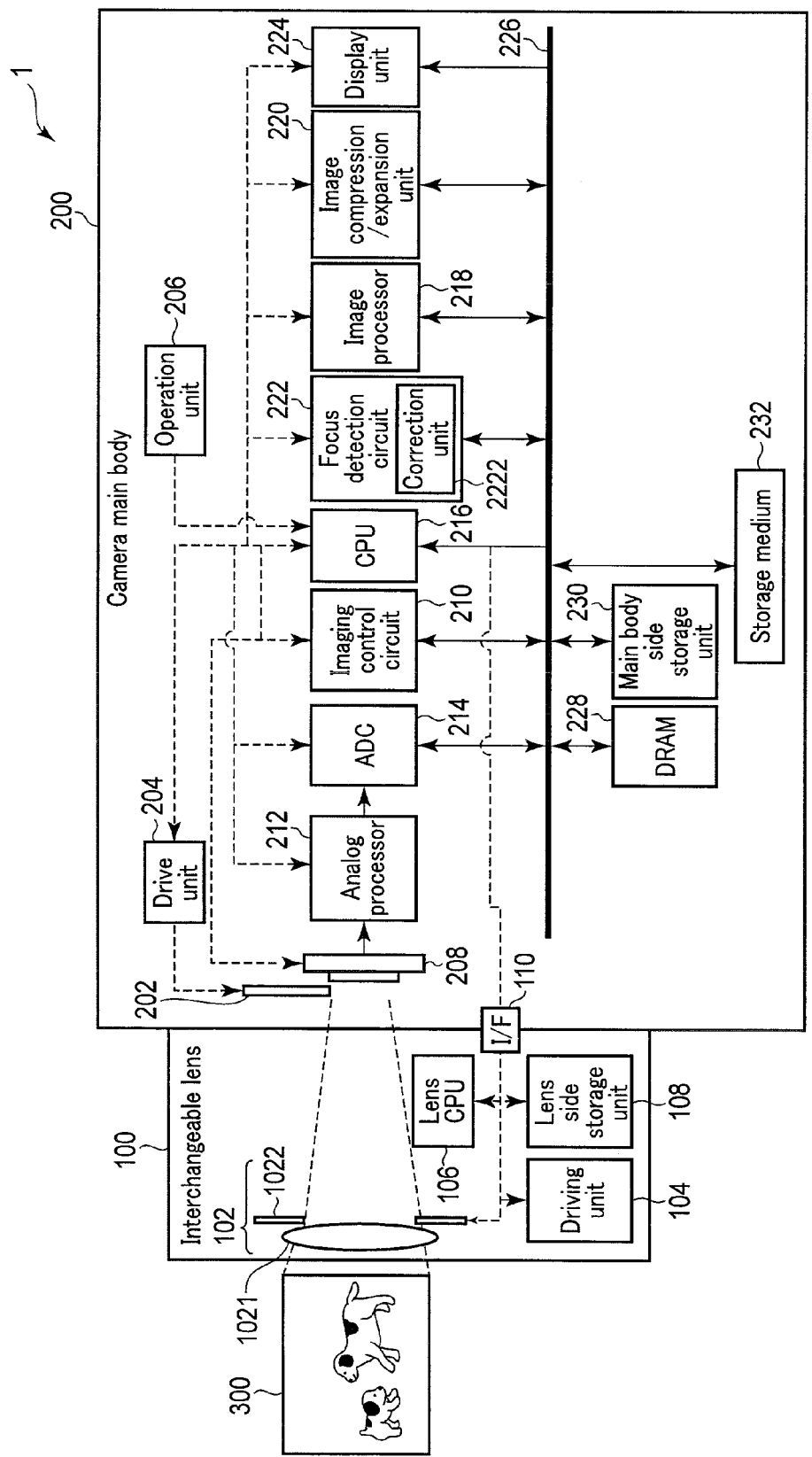
FIG. 1 is a block diagram showing an exemplary configuration of a camera system according to an embodiment.

FIG. 1 is a block diagram showing an exemplary configuration of a camera system according to an embodiment. In FIG. 1, a solid line with arrow indicates a flow of data, and a broken line with arrow indicates a flow of a control signal.

A camera system 1 shown in FIG. 1 includes an interchangeable lens 100 and a camera main body 200. The interchangeable lens 100 is detachably attached to the camera main body 200. The interchangeable lens 100 is connected to be communicable to the camera main body 200 when attached to the camera main body 200.

The interchangeable lens 100 includes an imaging lens 102, a driving unit 104, a lens CPU 106, and a lens side storage unit 108.

The imaging lens 102 is an imaging optical system to form an image by object luminous flux on an image sensor 208 of the camera main body 200. The imaging lens 102 includes a focus lens 1021 and a diaphragm 1022. The focus lens 1021 adjusts the focus point of the imaging lens 102 by moving in the optical axis direction. The diaphragm 1022 is placed on the optical axis of the focus lens 1021, and the aperture thereof is variable. The diaphragm 1022 controls the amount of object luminous flux passed through the focus lens 1021. The driving unit 104 drives the focus lens 1021 and the diaphragm 1022 based on a control signal from the lens CPU 106. The imaging lens 102 may be a zoom lens. In this case, the driving unit 104 performs zoom drive as well.

The lens CPU 106 is communicable to a CPU 216 of the camera main body 200 through an interface (I/F) 110. The lens CPU 106 controls the driving unit 104 in accordance with control by the CPU 216. The lens CPU 106 also transmits to the CPU 216 information such as lens data stored in the lens side storage unit 108 or a diaphragm value (F-number) of the diaphragm 1022 through the I/F 110.

The lens side storage unit 108 stores lens data regarding the interchangeable lens 100. The lens data includes, for example, information on optical aberration or information on focal length of the imaging lens 102. In addition, the lens data of the embodiment includes pupil data. The pupil data is data in which an F-number in accordance with the image height and the position of an exit pupil are associated with each other. The details of pupil data will be described later.

The camera main body 200 includes a mechanical shutter 202, a drive unit 204, an operation unit 206, an image sensor 208, an imaging control circuit 210, an analog processor 212, an analog to digital conversion unit (ADC) 214, a CPU 216, an image processor 218, an image compression/expansion unit 220, a focus detection circuit 222, a display unit 224, a bus 226, a DRAM 228, a main body side storage unit 230, and a storage medium 232.

The mechanical shutter 202 is formed as openable and closable, and adjusts an incidence time (exposure time of image sensor 208) of an object luminous flux from an object to the image sensor 208. The mechanical shutter 202 may be the well-known focal plane shutter, lens shutter, etc. The driving unit 204 drives the mechanical shutter 202 based on a control signal from the CPU 216.

The operation unit 206 includes various operation buttons such as a power supply button, a release button, a moving image button, a replay button, and a menu button, and various operation members such as a touch panel. The operation unit 206 detects an operation state of various operation members, and outputs a signal indicative of a detection result to the CPU 216.

The image sensor 208 is provided on the optical axis of the imaging lens 102, as a post-processing matter of the mechanical shutter 202, and at a position where an image is formed by the object luminous flux by the imaging lens 102. The image sensor 208 is formed so that photo diodes forming pixels are two-dimensionally arranged. In addition, a color filter of a Bayer array, for example, is placed on the front surface of photo diodes forming pixels. The Bayer array includes a line in which an R pixel and a G (Gr) pixel are alternately arranged in the horizontal direction, and a line in which a G (Gb) pixel and a B pixel are alternately arranged in the horizontal direction. The photodiodes forming the image sensor 208 generate a charge in accordance with the amount of received light. The charges generated at the photodiodes are stored in a capacitor connected to each photodiode.

The charge stored in the capacitor is read as an image signal in accordance with a control signal from the imaging control circuit 210. The image sensor 208 of the embodiment includes an imaging pixel to acquire an image for record or display, and a focus detection pixel to detect a focus.

The imaging control circuit 210 sets a driving mode of the image sensor 208 in accordance with a control signal from the CPU 216, and controls reading of an image signal from the image sensor 208 in accordance with a reading method corresponding to the set driving mode.

The analog processor 212 performs analog processing such as amplification processing to the image signal read from the image sensor 208 in accordance with control by the imaging control circuit 210. The ADC 214 converts the image signal output from the analog processor 212 into a digital image signal (pixel data). In the following description, a set of a plurality of items of pixel data is referred to as imaging data.

The CPU 216 performs total control of the camera system 1 in accordance with a program stored in the main body side storage unit 230. The image processor 218 performs various kinds of image processing to the imaging data to generate image data. For example, the image processor 218 performs image processing for still image recording to generate still image data when recording a still image. Similarly, the image processor 218 performs image processing for moving image recording to generate moving image data when recording a moving image. In addition, the image processor 218 performs image processing for display to generate display image data when presenting a live view.

The image compression/expansion unit 220 compresses image data (still image data or moving image data) generated at the image processor 218 when recording image data. The image compression/expansion unit 220 expands the compressed image data stored in the storage medium 232 when reproducing the image data.

The focus detection circuit 222 acquires pixel data from a focus detection pixel, and computes a defocus direction and a defocus amount relative to an in-focus position of the focus lens 1021 by using the known phase difference method, based on the acquired pixel data. The focus detection circuit 222 of the embodiment includes a correction unit 2222 that corrects non-uniformity in illumination distribution in the imaging data prior to focus detection.

The display unit 224 may be a liquid crystal display or an organic EL display, for example, and is placed, for example, at the rear surface of the camera main body 200. The display unit 224 displays an image in accordance with control by the CPU 216. The display unit 224 is used for live view display or displaying a stored image.

The bus 226 is connected to the ADC 214, the CPU 216, the image processor 218, the image compression/expansion unit 220, the focus detection circuit 222, the DRAM 228, the main body side storage unit 230, and the storage medium 232, and functions as a transmission path for transmitting various kinds of data generated at each block.

The DRAM 228 is an electrically rewritable memory, and temporarily stores various kinds of data such as the aforementioned imaging data (pixel data), recoding image data, display image data, and processing data in the CPU 216. An SDRAM may be used as a temporal storage unit.

The main body side storage unit 230 stores various data such as an adjustment value of the camera main body 200 or a program used in the CPU 216. In the embodiment, the main body side storage unit 230 stores correction data for illuminance correction in the correction unit 2222. The details of correction data will be described later.

The storage medium 232 may be installed in the camera main body 200 or attached to the camera main body 200, and stores recording image data as an image file with a predetermined format.

FIG. 2 illustrates the arrangement of focus detection pixels of an example of the image sensor 208. The example image sensor 208 has 37 AF areas as shown in FIG. 2. The 37 AF areas has seven pixel lines in total: a line a including three AF areas, a line b including five AF areas, a line c including seven AF areas, a line d including seven AF areas, a line e including seven AF areas, a line f including five AF areas, and a line g including three AF areas. In each AF area, a pixel array of focus detection pixels at a standard section and a pixel array of focus detection pixels at a reference section are arranged.

The pixel array of focus detection pixels at the standard section and the pixel array of focus detection pixels at the reference section have the same number of focus detection pixels. In addition, the pixel array of focus detection pixels at the standard section and the pixel array of focus detection pixels at the reference section have apertures in different areas in order to detect a phase difference. For example, in order to detect the phase difference in the horizontal direction, the left half (or right half) area of the focus detection pixels of the standard section is opened, and the right half (or left half) of the focus detection pixels of the reference section is opened.

The AF operation of the camera system 1 of the present embodiment will be explained below. FIG. 3 is a flowchart showing the AF operation of the camera system 1. The operation in the flowchart of FIG. 3 is executed by the CPU 216 based on a program stored in the main body side storage unit 230.

The operation in the flowchart of FIG. 3 is started when the imaging data is acquired. After the imaging data is acquired, the CPU 216 allows the focus detection circuit 222 to perform the AF processing. Accordingly, the focus detection circuit 222 executes sampling of a pixel output (pixel data) of a focus detection pixel in the imaging data (step S101). In the following example, it is assumed that "b_dat0[area][el]" represents a pixel output of a pixel array of a focus detection pixel at the standard section of each AF area before illuminance correction, which is obtained as a result of sampling, and that "r_dat0[area] [el]" represents a pixel output of a pixel array of a focus detection pixel at the reference section. The "area" indicates a position of an AF area. For the image sensor 208 of the example of FIG. 2, the "area" may be a value from zero to 36 (for example, the left end of line a is zero, and the right end of line g is 36). The "el" indicates a position of the focus detection pixel within each AF area. For example, if it is assumed that 100 pixels of focus detection pixels are arranged in each AF area, "el" may be a value from zero to 99 (for example, the focus detection pixel at the left end is zero, and the focus detection pixel at the right end is 99).

After sampling the pixel output, the focus detection circuit 222 executes the processing of illuminance correction 1 (step S102). The processing of illuminance correction 1 will be explained below. The illuminance correction 1 is processing for correcting non-uniformity of the illumination distribution in the imaging data.

Figure 4:
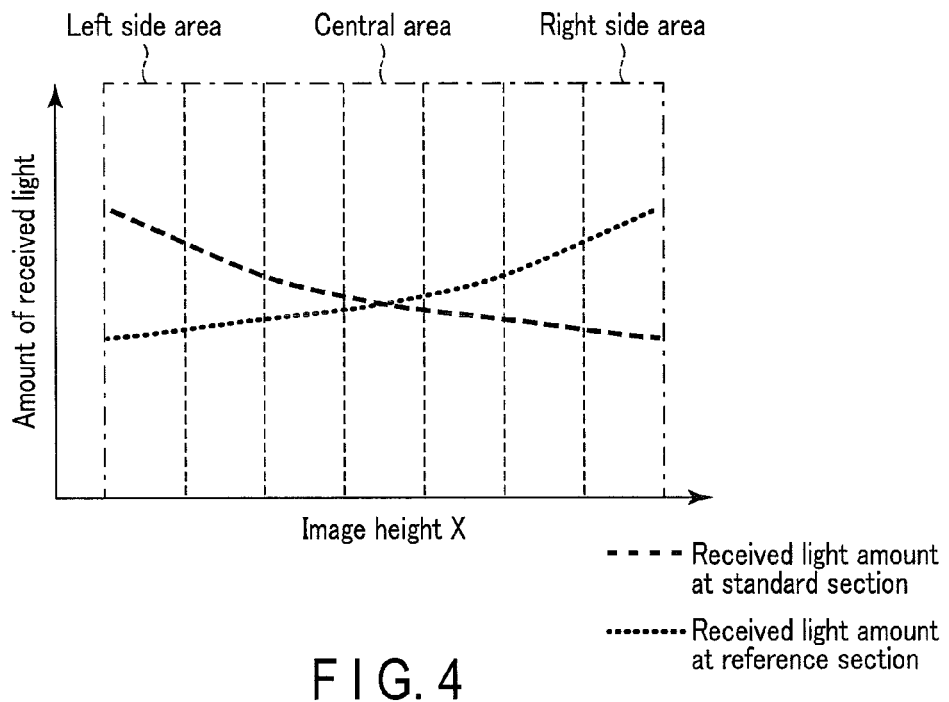
FIG. 4 illustrates an example of change in received light amount of the focus detection pixels.

Even if uniform light is applied, the light amount of the object luminous flux incident on the image sensor 208 is lowered in accordance with the distance from the center of the optical axis, due to properties of the interchangeable lens 100 (imaging lens 102). For example, FIG. 4 shows changes in received light amount in line d shown in FIG. 2 when uniform light is applied. In FIG. 4, the horizontal axis x represents the distance in the horizontal direction (image height), and the vertical axis represents the received light amount (value of pixel data). For example, the central image heights of seven AF areas in line d are "−0.15", "−0.1", "−0.05", "0", "0.05", "0.1" and "0.15".

Figure 5:
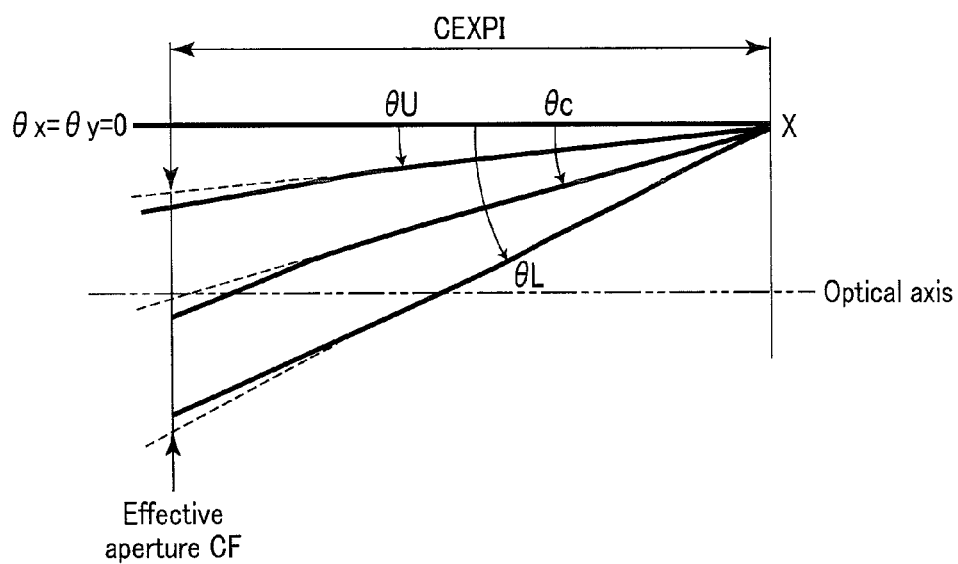
FIG. 5 illustrates the relationship between an effective aperture CF corresponding to a focus detection pixel having an image height x and an imaging luminous flux incident angle θc, which is a central direction of imaging luminous flux.

The properties of the interchangeable lens 100 that causes changes in the received light amount as shown in FIG. 4 are an exit pupil position EXPI and a F-number Fno. Some of the focus detection pixels are not on the optical axis of the imaging lens 102, and such focus detection pixels departing from the optical axis of the imaging lens 102 need to apply a corrected F-number CFno which has been corrected in accordance with the image height. Similarly, such focus detection pixels need to apply a corrected exit pupil position CEXPI which has been corrected in accordance with the image height. The method for computing the corrected F-number CFno and the corrected exit pupil position CEXPI will be explained with reference to FIG. 5. FIG. 5 illustrates the relationship between an effective aperture CF corresponding to a focus detection pixel having the height x and imaging luminous flux incident angle θc, which is a central direction of the imaging luminous flux. As shown in FIG. 5, the imaging luminous flux that forms an image at the position of the image height x is present within the range of an incident angle from θL to θU. The incident angle θL is the maximum incident angle at the side closer to the optical axis, and the incident angle θU is the maximum incident angle at the side far from the optical axis. The imaging luminous flux incident angle θc is the central angel between the incident angle θL and the incident angle θU. Thus, the incident angle θL, the incident angle θU, and imaging luminous flux incident angle θc have the following relationship: tan θc= (tan θL+tan θU)/2.

The incident angle of a beam to the light receiving surface of the image sensor 208 respectively corresponds to the position of intersection of a beam passing through the center of the imaging luminous flux (the broken lines in FIG. 5) and the optical axis. The position of intersection of a beam passing through the center of the imaging luminous flux and the optical axis is the corrected exit pupil position CEXPI (represented as the length with reference to the light receiving surface in FIG. 5). The corrected exit pupil position CEXPI is given by equation 1 described below.

The corrected exit pupil position CEXPI may differ from the original exit pupil position EXPI of the imaging lens 102.

$$CEXPI = x/\tan \theta c \quad \text{(Equation 1)}$$

The range of luminous flux applied to a pixel at the position of image height x is an effective aperture CF which is represented by $CF=1/(\tan \theta L - \tan \theta U)$. The corrected F-number CFno represents an effective aperture CF by an F-number. The corrected F-number CFno is given by equation 2 below.

$$CFno = CEXPI/CF \quad \text{(Equation 2)}$$

As can be seen from Equation 1 and Equation 2, the corrected exit pupil position CEXPI and the corrected F-number CFno vary in accordance with the image height x (i.e., the incident angle θL and the incident angle θU). Accordingly, if the corrected exit pupil position CEXPI and the corrected F-number CFno are known, the amount of change in the received light at a certain image height x can be estimated. By performing correction in accordance with the change in the received light amount, non-uniformity in illumination distribution in the imaging data can be corrected. Thus, in the embodiment, the lens side storage unit 108 stores the corrected exit pupil position CEXPI and the corrected F-number CFno of a representative image height x (e.g., the center of each AF area) as pupil data, and the main body side storage unit 230 stores illuminance correction data in accordance with the corrected exit pupil position CEXPI and the corrected F-number CFno. When performing AF, the focus detection circuit 222 acquires the corrected exit pupil position CEXPI and the corrected F-number CFno for the image height x stored in the lens side storage unit 108, acquires the illuminance correction data for the acquired corrected exit pupil position CEXPI and the corrected F-number CFno, and corrects non-uniformity in illumination distribution in accordance with the acquired illuminance correction data as shown in FIG. 5. The above operations are included in the processing of illuminance correction 1.

Figures 6, 7:
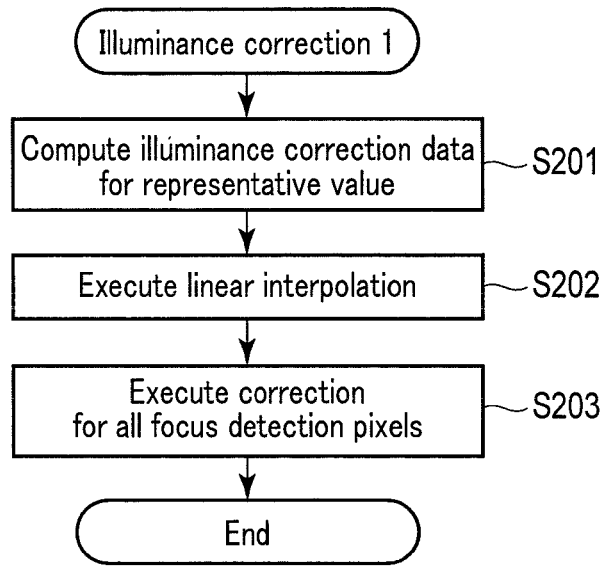
FIG. 6 is a flowchart showing the processing of illuminance correction 1.
FIG. 7 illustrates examples of correction exit pupil position CEXPI and correction F number CFno obtained at an interchangeable lens.

The processing of illuminance correction 1 will be explained in detail with reference to FIG. 6. An example of correcting non-uniformity in illumination distribution in line d will be explained. However, the processing may be applied to the other lines. The interchangeable lens 100 currently attached to the camera main body 200 is assumed to have a maximum aperture F-number Fno of 2.0, and an exit pupil position EXPI of 60 mm. In addition, it is assumed that the corrected exit pupil position CEXPI, and the corrected F-number CFno for each image height of the currently attached interchangeable lens 100 that are computed from pupil data stored in the lens side storage unit 108, are as shown in FIG. 7. Furthermore, it is assumed that illuminance correction data "hosei_b[area][CFno_index] [CEXPI_index]" and illuminance correction data "hosei_r[area][CFno_index] [CEXPI_index]" is 12-step illuminance correction data corresponding, for example, to four-step F-numbers Cfno=2, 4, 6, and 8 (CFno_index=0, 1, 2 and 3) and three-step exit pupil positions CEXPI=40 mm, 60 mm, and 80 mm (CEXPI_index=0, 1 and 2).

Figure 8:
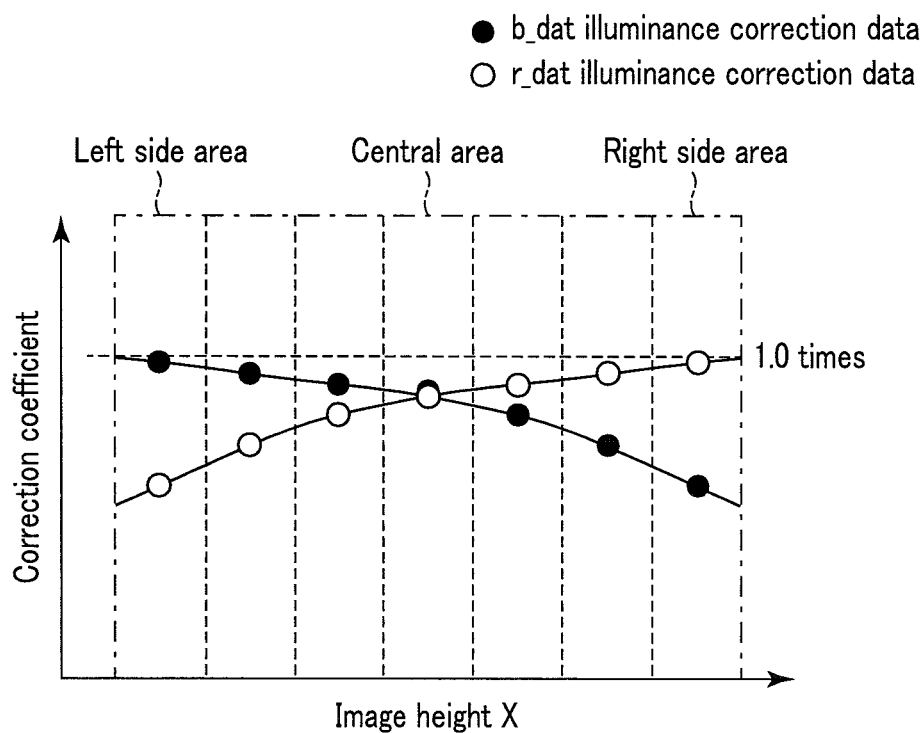
FIG. 8 illustrates an example of illuminance correction data.

As the processing of illuminance correction 1, the focus detection circuit 222 computes illuminance correction data for a representative value (step S201). If the corrected exit pupil position CEXPI and the corrected F-number CFno for a representative image height x of the currently attached interchangeable lens 100 are as shown in FIG. 7, when the image height x is ±0.15, CEXPI is 40 mm, which corresponds to CEXPI_index=0. If the image height x is ±0.15, CFno is 3, which corresponds to a value dividing CFno_index=0 (CFno=2) and CFno_index=1 (CFno=4) as 1:1. Accordingly, the focus detection circuit 222 sets illuminance correction data, for the case where the image height x is ±0.15 when the interchangeable lens 100 of FIG. 7 is attached, to be an average value of the illuminance correction data for the case where CEXPI_index=0, and CFno_index=0, and the illuminance correction data for the case where CEXPI_index=0, and CFno_index=1. Similarly, when the image height x is ±0.1, CEXPI is 40 mm, which corresponds to CEXPI_index=0. If the image height x is ±0.1, CFno is 2.5, which corresponds to a value dividing CFno_index=0 and CFno_index=1 as 1:3. Accordingly, the focus detection circuit 222 sets illuminance correction data for the case where the image height x is ±0.1 when the interchangeable lens 100 of FIG. 7 is attached to be a value obtained by adding a value of ¾ times the value of the illuminance correction data for the case where CEXPI_index=0, and CFno_index=0, and a value of ¼ times the value of the illuminance correction data for the case where CEXPI_index=0, and CFno_index=1. Similarly, when the image height x is ±0.05 or 0, CEXPI is 40 mm, which corresponds to CEXPI_index=0. On the other hand, when the image height x is ±0.05, or 0, CFno is 2, which corresponds to CFno_index=0. Accordingly, the focus detection circuit 222 sets illuminance correction data for the case where the image height x is ±0.05, or 0 when the interchangeable lens 100 of FIG. 7 is attached to be the value of the illuminance correction data for the case where CEXPI_index=0, and CFno_index=0. The above illuminance correction data is shown in FIG. 8. The black dots and white dots in FIG. 8 exhibit illuminance correction data for the representative image heights. The illuminance correction data shown in FIG. 8 is adjusted so that the light amount (pixel output) shown in FIG. 5, for example, is to be a constant value.

After computing illuminance correction data for the representative values, the focus detection circuit 222 computes illuminance correction data for image heights for positions of focus detection pixels constituting each AF area other than the representative values by linear interpolation (step S202). In the following explanation, illuminance correction data for each focus detection pixel in each AF area computed in step S202 is represented as "hosei_val_b[area] [el]" and "hosei_val_r[area][el]".

After computing illuminance correction data for each focus detection pixel in each AF area, the focus detection circuit 222 corrects a pixel output of each focus detection pixel (step S203). Then, the focus detection circuit 222 completes the processing of illuminance correction 1. In the following example, it is assumed that an pixel output of a focus detection pixel at the standard section after the illuminance correction 1 is represented as "b_dat1[area] [el]", and a pixel output of a focus detection pixel at the reference section is represented as "r_dat1[area] [el]", which are given by the following equation 3:

$$b\_dat1[area][el]=hosei\_val\_b[area][el] \times b\_dat0[area][el]$$

$$r\_dat1[area][el]=hosei\_val\_r[area][el] \times r\_dat0[area][el] \quad \text{(Equation 3)}$$

Figure 9A:
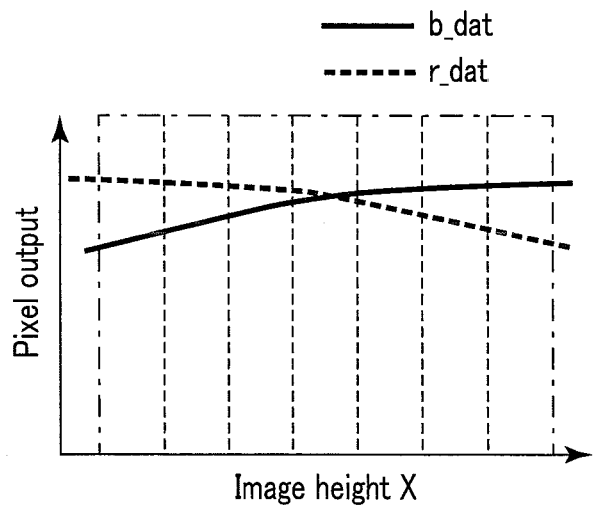
FIG. 9A is a first graph to explain illuminance correction 2.

Here the explanation returns to FIG. 2. After the illuminance correction 1, the focus detection circuit 222 executes the processing of illuminance correction 2 (step S103). The processing of illuminance correction 2 will be explained below. The illuminance correction 2 is performed to absorb influence of remnants of corrections due to variations in focus detection pixels that may occur because of design. The pixel output shown in FIG. 5 is corrected to be close to the constant value by the processing of illuminance correction 1. However, in reality the remnants of correction as shown in FIG. 9A may be generated due to variations in focus detection pixels. Such remnants of correction are corrected by detecting the amount of difference between a pixel output of a focus detection pixel at the standard section and a pixel output of a focus detection pixel at the reference section.

Figure 10:
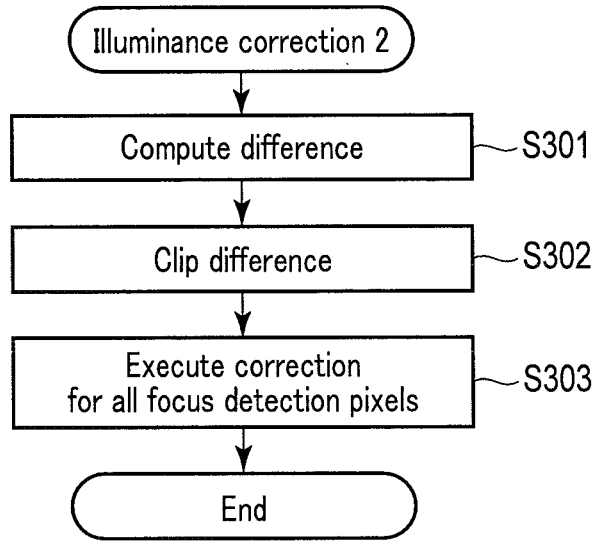
FIG. 10 is a flowchart showing the processing of illuminance correction 2.

The processing of illuminance correction 2 will be explained in detail with reference to FIG. 10. As the processing of illuminance correction 2, the focus detection circuit 222 computes the difference between a pixel output at the standard section and a pixel output at the reference section (step S301). When computing the difference, the focus detection circuit 222 computes an average value "Ave_b [area]" of pixel outputs of focus detection pixels at the standard section in each AF area, and an average value "Ave_r [area]" of pixel outputs of focus detection pixels at the reference section in each AF area. Then, the focus detection circuit 222 computes the difference "Balance [area]" as indicated in Equation 4.

$$Balance[area]=Ave\_b[area]/Ave\_r[area] \quad \text{(Equation 4)}$$

After computing the difference, the focus detection circuit 222 clips the difference within a predetermined range (step S302). The focus detection circuit 222 performs clipping so as to prevent erroneous focusing by noise caused by the difference between pixel outputs at the standard section and the reference section generated by variations in focus detection pixels or by contrast of the object image itself being expanded by correction. The upper limit "CLIP_arufa_Max" and the lower limit "CLIP_arufa_Min" of clipping value are determined based on the maximum value of noise caused by variations in focus detection pixels because of design. In addition, it is desirable to widen the range of clipping value for continuous AF in comparison with single AF. For example, if the upper limit "CLIP_arufa_Max" is 1.2, and the lower limit "CLIP_arufa_Min" is 0.8 for single AF, the upper limit "CLIP_arufa_Max" is set to be 1.3, and the lower limit "CLIP_arufa_Min" is set to be 0.7 for continuous AF. Accordingly, the range of clipping value for single AF is narrowed so as to reduce a possibility of generating erroneous focusing, thereby improving AF accuracy. On the other hand, if the range of clipping value for continuous AF is widened, a possibility of generating erroneous focusing increases, but AF speed can be increased.

Figure 9B:
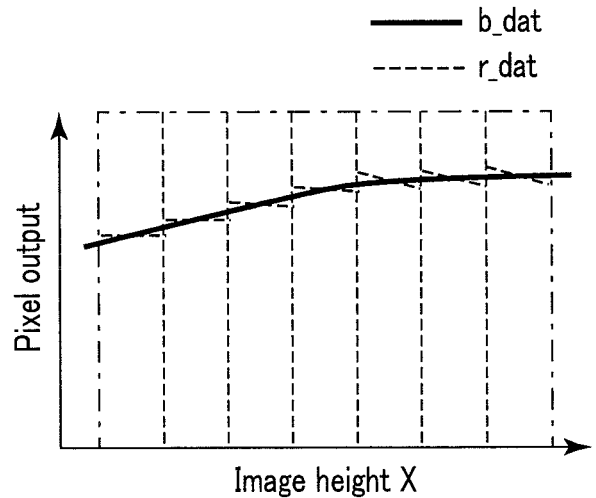
FIG. 9B is a second graph to explain illuminance correction 2.

After clipping the difference, the focus detection circuit 222 corrects a pixel output of a focus detection pixel at either of the standard section or the reference section by using the difference "Balance[area]" (step S303). For example, if a pixel output of a focus detection pixel at the reference section is corrected, the pixel output at the reference section after the illuminance correction 2 "r_dat2[area][el]" is given by Equation 6. FIG. 9B shows the pixel outputs of the focus detection pixels at the standard section and the reference section after the illuminance correction 2. By executing the illuminance correction 2, the remnants of correction can be decreased, and the pixel outputs at the standard section and the focus detection unit for the same image height become essentially the same as each other.

$$r\_dat2[area][el]==Balance[area] \times r\_dat1[area][el] \quad \text{(Equation 6)}$$

Returning to the explanation of FIG. 2, after the illuminance correction 2, the focus detection circuit 222 executes a correlation calculation for computing a defocusing amount (step S104). The correlation calculation is performed between a pixel output at the standard section "b_dat1[area][el]" and a pixel output at the reference section "r_dat2[area][el]".

The pixel shift amount for which the minimum correlation value F is obtained as a result of the correlation calculation between the pixel output at the standard section "b_dat1 [area] [el]" and the pixel output at the reference section "r_dat2[area][el]" is set as the defocusing amount. After the correlation calculation, the focus detection circuit 222 determines whether or not the defocusing amount is reliable (step S105). The reliability of the defocusing amount is determined based, for example, on the correlation value F. When the minimum correlation value which corresponds to the defocusing amount is sufficiently small, and the gradient around the minimum correlation value is sufficiently large, it is determined that the defocusing amount is reliable. It is determined whether the minimum correlation value is sufficiently small by determining whether the minimum correlation value Fmin is equal to or less than FINT, where FINT represents a threshold, as shown in FIG. 11A. FIG. 11A shows an example where the defocusing amount is not reliable. It is determined whether or not the gradient around the minimum correlation value is sufficiently large by determining whether or not FS is equal to or greater than FSmin as illustrated in FIG. 11B, where FS is a larger one of FM-Fmin and FP-Fmin. FM is a correlation value of a pixel position where el is smaller than min by one, and FP is a correlation value of a pixel position where el is greater than min by one.

In step S105, if it is determined that the defocusing amount is not reliable, the focus detection circuit 222 terminates the processing shown in FIG. 2 by determining that focusing is unsuccessful. At this time, the focus detection circuit 222 causes the display unit 224, for example, to present that the imaging lens 102 is currently in an unfocused state. In step S105, if it is determined that the defocusing amount is reliable, the focus detection circuit 222 determines whether the imaging lens 102 is in a focused state (step S106). For example, if the defocusing amount is less than a threshold, it is determined that the imaging lens 102 is in the focused state. In step S106, if it is determined that the imaging lens 102 is in the focused state, the focus detection circuit 222 terminates the processing shown in FIG. 2 by determining that focusing is successful. At this time, the focus detection circuit 222 causes the display unit 224, for example, to present that the imaging lens 102 is currently in the focused state. In step S106, if it is determined that the imaging lens 102 is in the focused state, the focus detection circuit 222 transmits the defocusing amount to the CPU 216. Based on the defocusing amount, the CPU 216 controls the lens CPU 106 to drive the focus lens 1021 of the imaging lens 102 to the focused position (step S107). Then, the CPU 216 returns the processing to step S101.

As explained above, according to the embodiment, the interchangeable lens 100 stores pupil data corresponding to image heights, and the camera main body 200 stores illuminance correction data corresponding to the pupil data so that the illuminance correction according to the interchangeable lens 100 can be performed. That is, even if the specifications of the interchangeable lens 100 are changed, illuminance correction can be executed without modifying the illuminance correction data table of the camera main body.

In addition, the pixel outputs at the reference section are corrected in the illuminance correction 2 so that illuminance correction can be executed while eliminating the influence of variations in focus detection pixels or contrast of the object image. Furthermore, illuminance correction data is clipped in the illuminance correction 2 so as to reduce a possibility of generating erroneous focusing by overcorrection.

The aforementioned examples simplify the number of pixels, F-number, or exit pupil position. However, they are not limited thereto in actual implementation. In an example, AF is started at a maximum aperture; however, the diaphragm 1022 does not have to be at the maximum aperture. The representative values of image height are not limited to be central positions of AF areas. One AF area may have two or more representative values.

The processing according to the above embodiment may be stored in the form of programs executable by the CPU 216. The programs can be stored and distributed in the storage mediums of external storage devices, such as a memory card (e.g., a ROM card, or a RAM card), a magnetic disk (e.g., a hard disk), an optical disk (e.g., a CD-ROM or a DVD), or a semiconductor memory. The CPU 216 reads the programs from a storage medium of an external storage device, and the operations can be executed and controlled based on the read programs.

What is claimed is:

1. A camera system comprising an interchangeable lens including an imaging optical system including a focus lens, and a camera main body to which the interchangeable lens is detachably attached,
    wherein the interchangeable lens comprises a lens side storage unit that stores pupil related data according to an image height,
    wherein the camera main body comprises:
    an image sensor including a plurality of imaging pixels for imaging, and a plurality of focus detection pixels for focus detection;
    a main body side storage unit that stores correction data for correcting non-uniformity in illumination distribution by incident light to the focus detection pixels based on outputs of the focus detection pixels; and
    a correction unit that receives the pupil related data from the lens side storage unit, and corrects non-uniformity in illumination distribution of outputs of the focus detection pixels based on the correction data and the pupil related data,
    wherein the pupil related data is data regarding an F-number of the interchangeable lens and data regarding an exit pupil position of the interchangeable lens,
    wherein the data regarding the F-number of the interchangeable lens indicates a range of luminous flux to be applied to the focus detection pixels at a predetermined image height, and
    wherein the data regarding the exit pupil position of the interchangeable lens relates to a position of intersection of a center of luminous flux applied to the focus detection pixels at a predetermined image height and an optical axis of the imaging optical system.

2. The camera system according to claim 1,
    wherein the plurality of focus detection pixels correspond to either one of a standard section and a reference section for detecting a phase difference, and
    the correction unit detects a difference amount between outputs of the focus detection pixels at the standard section and at the reference section, and computes a correction coefficient for correcting non-uniformity in the outputs of the focus detection pixels based on the difference amount.

3. The camera system according to claim 2, wherein the correction unit limits the correction coefficient to be a threshold when the correction coefficient exceeds the threshold.

4. The camera system according to claim 2, wherein the main body side storage unit stores a plurality of items of correction data each corresponding to a plurality of items of the pupil related data, and
    the correction unit computes a representative correction data from the plurality of items of correction data based on the pupil related data to correct the non-uniformity in the illumination distribution.

5. A method for focus detection pixel correction for correcting an output of a focus detection pixel in a camera system comprising an interchangeable lens which include an imaging optical system including a focus lens and which stores pupil related data according to an image height, and a camera main body to which the interchangeable lens is detachably attached and which comprises an image sensor including a plurality of imaging pixels for imaging, and a plurality of focus detection pixels for focus detection, the method comprising:
    reading correction data stored in the camera main body for correcting non-uniformity in illumination distribution by incident light to the focus detection pixels based on outputs of the focus detection pixels;
    receiving the pupil related data from the interchangeable lens; and
    correcting non-uniformity in illumination distribution of the outputs of the focus detection pixels based on the correction data and the pupil related data,
    wherein the pupil related data is data regarding an F-number of the interchangeable lens and data regarding an exit pupil position of the interchangeable lens,
    wherein the data regarding the F-number of the interchangeable lens indicates a range of luminous flux to be applied to the focus detection pixels at a predetermined image height, and
    wherein the data regarding the exit pupil position of the interchangeable lens relates to a position of intersection of a center of luminous flux applied to the focus detection pixels at a predetermined image height and an optical axis of the imaging optical system.

6. The method for focus detection pixel correction according to claim 5,
    wherein the plurality of focus detection pixels correspond to either one of a standard section and a reference section for detecting a phase difference, the correcting non-uniformity in illumination distribution of the outputs of the focus detection pixels includes:

detecting a difference amount between outputs of the focus detection pixels at the standard section and at the reference section;

computing a correction coefficient for correcting non-uniformity in the outputs of the focus detection pixels based on the difference amount; and correcting the non-uniformity in illumination distribution by the correction coefficient.

7. The method for focus detection pixel correction according to claim 6, wherein the computing the correction coefficient includes limiting the correction coefficient to be a threshold when the correction coefficient exceeds the threshold.

8. The method for focus detection pixel correction according to claim 5, wherein the reading the correction data includes reading a plurality of items of correction data each corresponding to a plurality of items of the pupil related data, and wherein the correcting includes computing a representative correction data from the plurality of items of correction data based on the pupil related data to correct the non-uniformity in the illumination distribution.

* * * * *